(12) United States Patent
Bjornsson et al.

(10) Patent No.: US 10,995,465 B2
(45) Date of Patent: May 4, 2021

(54) DAMPER FOR ABSORBING SHOCK GENERATED UPON DOCKING A MOVING STRUCTURE WITH A STATIONARY STRUCTURE OR FOUNDATION

(71) Applicant: Vetco Gray Scandinavia AS, Sandvika (NO)

(72) Inventors: Peter Bjornsson, Sandvika (NO); Magnus Geiran, Sandvika (NO)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 134 days.

(21) Appl. No.: 16/472,598

(22) PCT Filed: Dec. 21, 2017

(86) PCT No.: PCT/EP2017/084037
§ 371 (c)(1),
(2) Date: Jun. 21, 2019

(87) PCT Pub. No.: WO2018/115254
PCT Pub. Date: Jun. 28, 2018

(65) Prior Publication Data
US 2019/0316311 A1    Oct. 17, 2019

(30) Foreign Application Priority Data
Dec. 22, 2016 (NO) .................................. 20162042

(51) Int. Cl.
*E02B 17/02* (2006.01)
*E02B 3/26* (2006.01)
(Continued)

(52) U.S. Cl.
CPC ............. *E02B 17/024* (2013.01); *E02B 3/26* (2013.01); *F16F 9/22* (2013.01); *F16F 9/3235* (2013.01);
(Continued)

(58) Field of Classification Search
CPC .. E02B 17/024; E02B 3/26; F16F 9/22; F16F 9/512; F16F 9/446; F16F 9/3235;
(Continued)

(56) References Cited

U.S. PATENT DOCUMENTS 3,750,856 A * 8/1973 Kenworthy ............. F16F 9/512
188/287
4,057,129 A * 11/1977 Hennells ................... F16F 9/48
188/285

(Continued)

FOREIGN PATENT DOCUMENTS

CN     202531541 U * 11/2012 ............. B63B 38/00
NL       7400716 A *  7/1975 ........... E02B 17/024

*Primary Examiner* — Xuan Lan Nguyen
(74) *Attorney, Agent, or Firm* — Baker Hughes Patent Organization

(57) ABSTRACT

A damper for absorbing impact shock generated upon docking of a moving structure with a stationary structure or foundation is shown, the damper comprising a cylinder (1) connectable to the docking structure, the cylinder arranged with a cap end and a head end and having a piston (2) arranged movable in the cylinder and separating a cylinder cap volume (13) from a cylinder head volume (10). A check valve (14), a pressure relief valve (15) with adjustable opening pressure and an orifice (16; 23) of static size are respectively arranged in the cap end of the cylinder, wherein under constant load from the piston during a terminal stroke length of the damper in compression, the orifice provides a restricted flow from cylinder cap volume generating a constant pressure in the cylinder cap volume below the opening pressure of the pressure relief valve.

10 Claims, 2 Drawing Sheets

(51) Int. Cl.
  *F16F 9/22*   (2006.01)
  *F16F 9/32*   (2006.01)
  *F16F 9/44*   (2006.01)
  *F16F 9/512*  (2006.01)

(52) U.S. Cl.
  CPC ............ *F16F 9/3242* (2013.01); *F16F 9/446* (2013.01); *F16F 9/512* (2013.01); *F16F 2222/12* (2013.01); *F16F 2228/066* (2013.01); *F16F 2230/186* (2013.01)

(58) Field of Classification Search
  CPC ............... F16F 9/3242; F16F 2230/186; F16F 2228/066; F16F 2222/12
  See application file for complete search history.

(56) References Cited

U.S. PATENT DOCUMENTS

| | | | | |
|---|---|---|---|---|
| 4,515,253 | A * | 5/1985 | Itoh | F16F 9/446 188/285 |
| 4,732,244 | A * | 3/1988 | Verkuylen | F16F 9/446 137/493.8 |
| 8,256,587 | B2 * | 9/2012 | Bakke | E02B 17/024 188/287 |
| 2014/0318909 | A1 * | 10/2014 | Bakke | F16F 9/348 188/313 |

* cited by examiner

DAMPER FOR ABSORBING SHOCK GENERATED UPON DOCKING A MOVING STRUCTURE WITH A STATIONARY STRUCTURE OR FOUNDATION

TECHNICAL FIELD OF THE INVENTION

The present invention relates to a damper arranged to provide shock absorption and soft landing of a subsea structure which is lowered through the water for landing on and mating with another submerged structure or foundation resting on the seafloor. Use of the damper is however not restricted to vertical lowering operations in water—the damper is equally useful for shock absorption and soft landing in any arbitrary docking operation between a moving structure and a stationary structure, whether performed on land, at sea surface or subsea.

BACKGROUND AND PRIOR ART

Landing of subsea structures from a surface vessel or ship for installation onto structures or foundations that are already installed on the seafloor often requires a soft landing system in order to reduce the impact forces on the landing structure as well as on the already installed supporting structure.

A damper for this purpose is previously known from U.S. Pat. No. 8,256,587 B2. A piston/barrel unit is disclosed comprising a piston arranged slidably in the barrel. A piston rod extends from a lower end of the barrel for impact with an intended substructure on the seafloor. During lowering of the damper through the body of seawater, a barrel volume above the piston is filled with water which enters in the head of the barrel and passes the piston via axial passages through the piston. Rows of exit openings of successively reducing diameter towards the top of the barrel are formed through the barrel wall. As the piston moves past these exit openings in compression of the damper, the flow area provided by these openings is reduced in exponential way.

U.S. Pat. No. 8,256,587 B2 is one example of the type of dampers which control the water flow and pressure by a certain geometrical flow path with a decreasing outflow area. Other examples include annulus/needle designs, triangular hole shapes and different hole patterns. A disadvantage common to dampers designed for controlling water flow and pressure through a certain geometry and a water escape area that decreases over the stroke length is that the damping behaviour of these solutions seem less predictable, and are lacking an ability to be adjusted and adapted for a certain structure weight within a weight range.

SUMMARY OF THE INVENTION

It is an object of the present invention to provide a damper for the subject purpose which is more predictable than the dampers of prior art in terms of expected performance.

It is another object to provide a damper design which has great potential for up- and down scaling within a general design concept.

It is still another object to provide a damper with an ability to be tuned and optimized for a certain structure weight within a weight range, without modifying the design.

It is even further an object to provide a damper which is composed of standardized parts and commercially available off the shelf components, thus requiring only a minimum of manufacturing steps and facilities, thus making it cost efficient.

One or more of these objects are met in a damper which can be summarized as follows:

A damper for absorbing impact shock generated upon docking a moving structure with a stationary structure or foundation, the damper comprising:

- a cylinder connectable to the subsea structure, the cylinder arranged with a barrel, cap end and a head end;
- a piston movable in the barrel, the piston defining a barrel volume in the cap end of the barrel or cylinder which varies with the position of the piston in extension and compression;
- a check valve arranged in the cap end of the cylinder, the check valve in open state permitting flow into the cylinder cap volume as the piston is extended;
- a pressure relief valve in the cap end of the barrel or cylinder adjustable to open upon exceeding of a predetermined internal pressure in the cylinder cap volume, in open state permitting restricted flow from the cylinder cap volume;
- an orifice of static size in the cap end of the cylinder, wherein under constant load from the piston during a terminal stroke length of the damper in compression, the orifice provides a restricted flow from the cylinder cap volume generating a constant pressure in the cylinder cap volume below the opening pressure of the pressure relief valve.

A damper as recited provides more predictable damping behaviour than state of the art dampers. A reason for this is that pressure is controlled by a pressure relief valve having a known (predefined) opening pressure and a known pressure rise curve for a varying flow rate, rather than relying on hole geometry or decreasing water escape area over the stroke length.

The predefined opening pressure of the valve can be adjusted for a structure weight range, whereby the damper can be optimized for a certain structure weight by calibrating the valve opening pressure. In addition, the size of the orifice can be modified and used for optimization of the damping performance. Thus, by controlling the valve flow capacity and opening pressure, orifice diameter and cylinder main dimensions, barrel dimensions, dampers can be designed to provide predictable and desired performance for a wide range of structure weights.

Following upon the shock absorption phase, the damper is subjected to a static load from the docking structure in the final soft landing phase. It is preferred that the transfer between the shock absorption and soft landing phases is made as smooth as possible and preferably with a minimum pressure step. A pressure difference of 5-15 bar between the phases is considered suitable in order to avoid sudden pitching and unintentionally exceeding of the opening pressure of the pressure relief valve.

Thus, in one embodiment, the size of the orifice is determined to generate a constant pressure of from about 5 bar to about 15 bar below the opening pressure, under static load from the moving structure.

It should be noted that the expression "constant pressure" as used herein shall be interpreted to include some fluctuation in pressure, rise or descent, from the pressure in the cylinder cap volume at the moment where the pressure relief valve closes after shock absorption. In that sense the word "constant" shall also mean nearly constant or substantially constant within a pressure level range, and preferably within a range of 5-15 bar below the opening pressure of the pressure relief valve.

An advantageous embodiment foresees a pressure control manifold arranged for accommodation of the check valve and the pressure relief valve, as an integer unit connectable to the cylinder. This embodiment provides a modular system that facilitates multiplication of a pressure relief valve with known capacity for use in dampers of varying sizes. Thus, in one embodiment, the pressure control manifolds are arranged connectable in series for multiplication of pressure relief valves.

It is preferred that the piston is journaled in the barrel through a low friction sealing system that promotes extension of the piston through gravity as the damper is lowered through the sea with a subsea structure.

Further details and specification of preferred embodiments will appear from the detailed description given below.

BRIEF DESCRIPTION OF THE DRAWINGS

Embodiments of the invention will be explained below with reference made to the accompanying drawings. In the drawings.

DETAILED DESCRIPTION OF PREFERRED EMBODIMENTS

Figure 1:
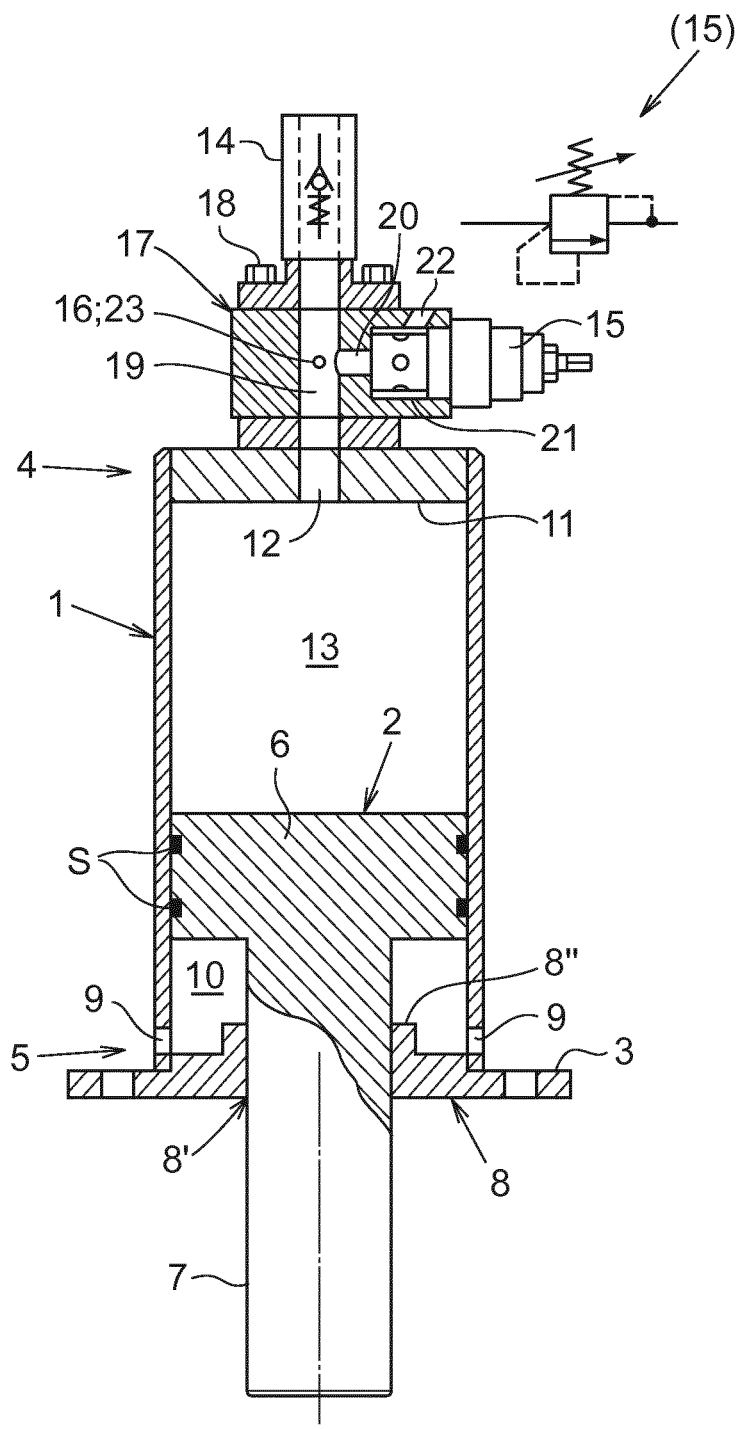
FIG. 1 is a sectional view through the longitudinal axis of a damper embodiment according to the invention.

The damper of FIG. 1 comprises a cylinder with a barrel 1 in which a piston arrangement 2 is arranged axially movable in back and forth directions, i.e. in extension and compression respectively. On its outside the cylinder comprises means for mounting the damper 1 to a moving structure intended for docketing with a stationary structure, such as upon submersion of a subsea structure into the sea to be landed on another subsea structure or foundation which is resting on the seabed. The mounting means may be realized as a radial flange 3, for example. Other types of attachment means are of course possible. Without restricting use of the damper to the orientation shown in FIG. 1 for purpose of disclosure, the cylinder 1 extends from a cap end 4 to a head end 5.

The piston arrangement 2 comprises a piston 6 carried in an inner end of a piston rod 7. The piston and piston rod may be formed integrally as a single unit or separately manufactured and assembled.

In lowering operations, as an effect of its massive structure, the piston arrangement 2 is forced by gravity to assume its outermost position relative to the head end of the cylinder, i.e. in the unloaded and expanded state of the damper. In the expanded state the piston rod 7 thus projects with an outer end outside the head end of the cylinder. In order to promote an unhindered descent or extension of the piston 2 out of or from the cylinder 1 as the damper is lowered through the water with the subsea structure, a low friction sealing system S is arranged on the periphery of the piston for journaling the piston arrangement and sealing against the inner wall of the cylinder.

In FIG. 1 however, the damper is shown in slightly compressed state for reasons of visibility.

In the head end 5 the cylinder has a head plate 8 formed with a through hole 8' for guidance of the piston rod. A shoulder 8" rising from the head plate defines the lowermost or most extended position of the piston. As illustrated in FIG. 1, the flange 3 may be formed as an integrated part of the head plate 8.

Openings 9 may be formed through the wall of the cylinder above the head plate 8. The openings 9 are sized and numbered to permit unrestricted flows of seawater in both directions from a cylinder volume 10 below the piston head, a volume which varies in dependence on the position of the piston. The openings 9 may be located on a circle in the periphery of the cylinder.

In the cap end 4 the cylinder is sealed by a cap plate 11 with a through hole 12 for controlled flows in both directions from a cylinder cap volume 13 above the piston head, a volume which is likewise variable in dependence on the position of the piston.

The controlled flows of the cylinder cap volume 13 comprises unrestricted inflow of seawater via a check valve 14 during expansion of the damper in the unloaded state, restricted outflow via a pressure relief valve 15 upon reach of a predetermined pressure in the water in the cylinder cap volume during compression of the damper in the loaded state, and a restricted outflow routed via a static orifice 16 as the pressure in the cylinder cap volume is reduced to a level below the opening pressure of the pressure relief valve.

Thus, in subsea applications, the damper can be seen as part of a hydraulic system: after use in the piston/cylinder unit 1-2, the water is discharged to "tank", i.e. discharged to the surrounding sea at the prevailing water pressure to which also the inlet to the cylinder is connectable for filling of the cylinder.

The check valve 14 is a one-way valve as schematically illustrated through the flow chart symbol drawn into the cross-sectional view of the damper in FIG. 1. In order to ensure a quick return of the piston and refilling of the cylinder in case of multiple landings or unforeseen dynamic motions of the docking structure, a check valve is preferably chosen which has a high flow rate capacity at fully open state in relation to the "cracking" pressure which initiates opening of the check valve. Check valves suitable for this purpose are available in the commerce, providing flow capacities in the range of 10,000 l/min and cracking pressures down to tenths of a bar, e.g.

The pressure relief valve 15 is an adjustable spring-biased, normally closed valve which is reactive to the pressure on the upstream side of the valve for shifting the valve into open position if the upstream pressure exceeds the bias from the spring, as illustrated by the flow chart symbol (15) inserted in FIG. 1.

The check valve 14, pressure relief valve 15 and orifice 16 are all preferably arranged in the cap end of the damper, in or above the cap end plate 11.

More precisely, in one embodiment, the check valve 14, pressure relief valve 15 and orifice 16 are accommodated in a pressure control manifold 17 which is mountable to the cap end plate 11 in the cap end of the damper. The pressure control manifold 17 can be coupled to the cap end plate by means of through bolts 18.

The pressure control manifold 17 can be arranged with mating surfaces in upper and lower sides thereof designed for interconnection of pressure control manifolds in series, with or without spacer elements inserted between them. The pressure control manifold may in this way be realized as a standardized component which can be multiplied in scaled-up embodiments of the damper. The pressure control manifold may advantageously be arranged with an SAE J518 Code 62 interface for use of high pressure series, standardized 4-bolt flanges in the connection of check valve, pressure relief valve and cylinder body.

The pressure control manifold 17 comprises a main bore 19 aligned with the through hole 12 in the cap end plate 11. The check valve 14 is aligned with the main bore 19 for unrestricted inflow of seawater via the main bore in the open state of the check valve. The check valve may be a ball valve or poppet valve, e.g., instantly terminating the inflow of water as the extension motion of the piston is stopped.

A branch bore 20 connects the main bore 19 with a seat 21 arranged for accommodation of the pressure relief valve 15, typically through a threaded engagement between valve and seat. The valve seat 21 comprises an exit bore 22 via which water, passing through the pressure relief valve, can be discharged from the cylinder cap volume 13 to the ambient environment in the open state of the pressure relief valve.

The orifice 16 can be arranged in the pressure control manifold 17 in the form of a bore 23 that connects the main bore 19 with the ambient. The orifice 16 may alternatively be arranged as a bore through the cap end plate 11, if appropriate (not shown).

Referring also to the relative pressure curve displayed in the diagram of FIG. 2, the operation of the damper is explained as follows:

Upon lowering in seawater, e.g., gravity pulls the piston 2 towards its outermost position in the cap end of the cylinder. The descent of the piston results in a shortfall of water in the cylinder cap volume 13, causing the check valve 14 to open for inflow of water via the main bore 19. The water volume below the piston is concurrently pushed out via the openings 9 through the cylinder wall.

As the lower end of the piston rod 7 hits the stationary structure on the seabed the damper is loaded, wherein the pressure in the cylinder cap volume rises instantly, causing the check valve to close. From a pressure maximum exceeding the opening pressure of the pressure relief valve 15, water pressure gradually descends as water is discharged via the open pressure relief valve until the pressure in the cylinder cap volume passes below the opening pressure, and the pressure relief valve again closes.

The water remaining in the upper cylinder volume 13 after closure of the pressure relief valve 15 is forced by the piston, now under static load from the docking structure, to escape via the orifice 16. The size of the orifice 16 is determined to restrict the flow there through for a pressure build up in the cylinder, and thus preserving a pressure in the cylinder cap volume which controls the docking velocity during a terminal stroke length of the damper in compression. Yet, the flow through the orifice is sufficient for keeping the pressure below the opening pressure of the pressure relief valve.

EXAMPLE I

Figure 2:
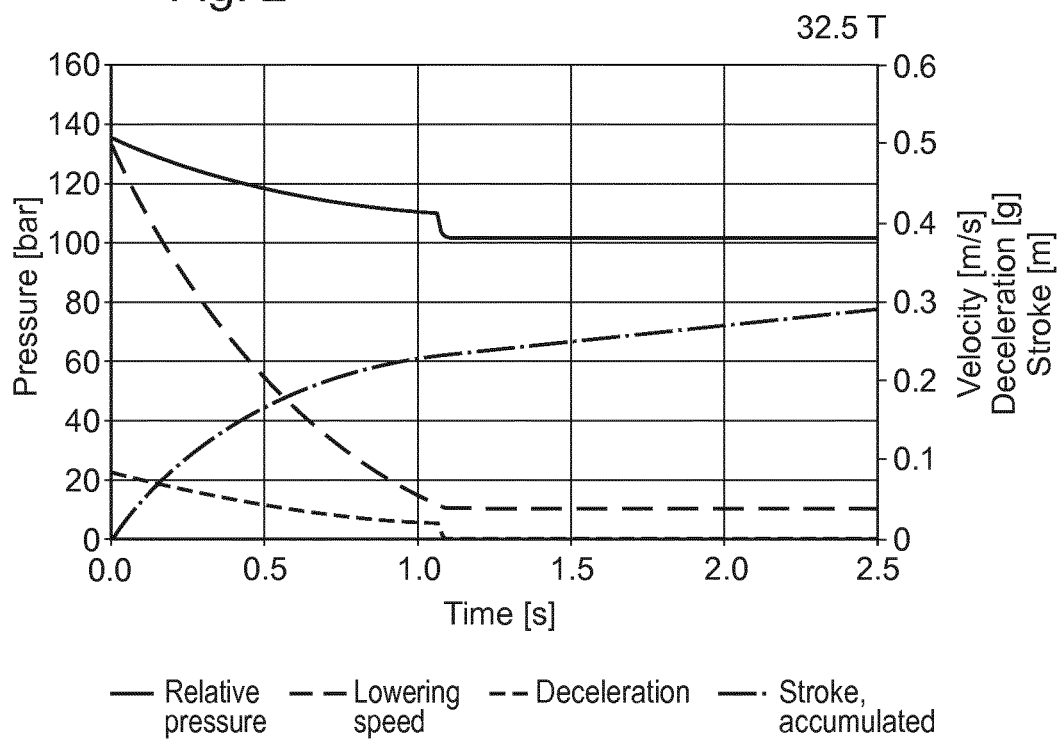
FIG. 2 is a diagram showing the performance of a damper according to a first embodiment of the invention.

The significant and characterizing achievement of the damper is demonstrated in tests using a flow calculation method which takes into account relevant design parameters such as the cylinder geometry, characteristics and setting for the pressure relief valve and the size of the orifice. FIG. 2 shows the performance characteristics of a first embodiment of the damper. The specification for this embodiment is as follows:

Damper capacity
(gross weight of structure): 32.5 T
Docking velocity at start
of damper stroke: 0.5 m/s
Cylinder diameter: 200 mm
Stroke length: 300 mm
Max damper force: 426 kN
Relief valve opening pressure: 110 bar (manually adjustable)
Orifice diameter: 4 mm
Final docking velocity: 0.04 m/s The diagram of FIG. 2 demonstrates a damper performance which is characterized by constant relative pressure, constant lowering speed, constant deceleration, and a linear stroke curve for the terminal 1.4 seconds of the compression stroke, i.e. from the point where the pressure relief valve has closed and the water escapes via the orifice 16 only.

Design considerations include a pressure relief valve setting and orifice size which shall be dimensioned to provide a flow resistance that is adapted to a specific structure weight in order to reach the terminal velocity requirement within the stroke length of the damper. The damper specifications thus need to be adapted for each case of application. Designing method is based on Bernoulli's Law and pressure drop calculations, which are per se familiar to a person skilled in the art of fluid dynamics, and on the characteristics of the pressure relief valve.

In the above recited Example I, a commercially available, normally closed, direct acting valve cartridge for hydraulic applications was used as pressure relief valve 15. The technical data of this valve cartridge include a flow capacity (oil) of 760 l/min, a maximum operating pressure of 350 bar and an opening pressure setting range of 35-210 bar. The response time, 2 ms, can be considered as providing immediate response in the damper application.

For scaled up embodiments of the damper, two or more pressure relief valves can be installed to provide required flow capacity and rate of retardation. In this connection it shall be noted that the flow capacity for water is typically, due to a lower viscosity for water than for oil, substantially higher than the flow rating based on oil. In addition, due to the low viscosity of water, the pressure rise curve for water will typically be flatter, which beneficially results in a lower peak force during the damping stroke. Due to availability, the design method is based on valve characteristics with the use of hydraulic oil, and the pressure relief valve may thus need to be calibrated for use with water. It shall also be noted that pressure relief valves are available in different sizes. The recited valve which is chosen for the different embodiments of the disclosure is available in different sizes ranging up to an opening pressure of 420 bar, e.g., all potentially useful in a damper according to the invention.

EXAMPLE II

Figure 3:
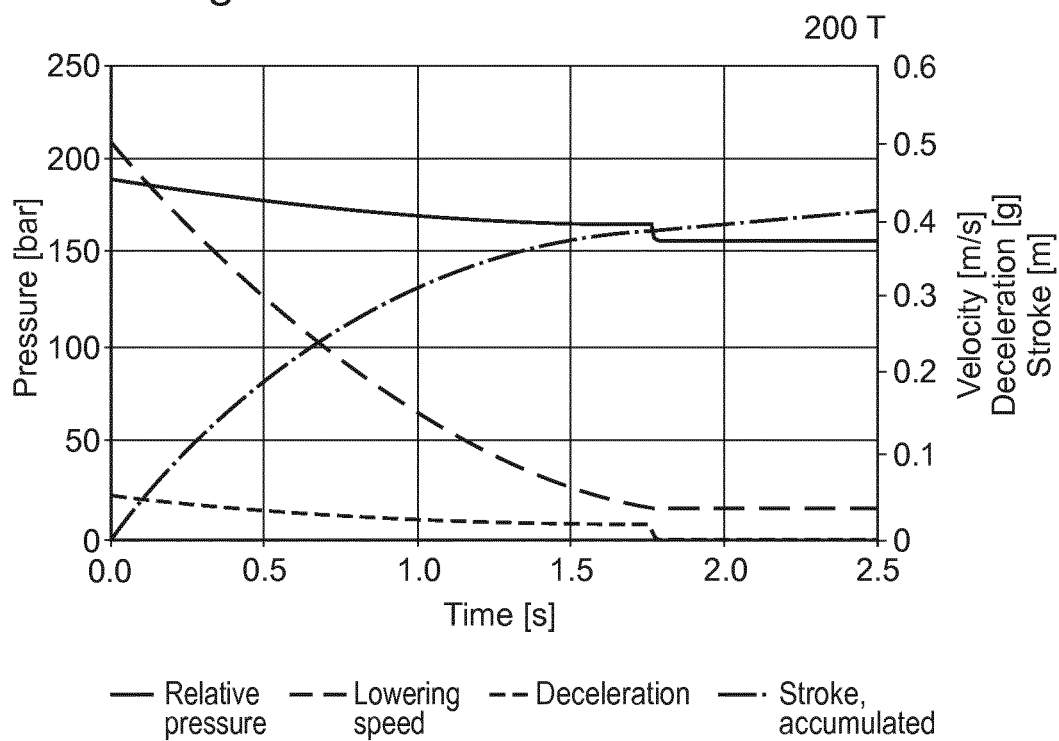
FIG. 3 is a corresponding diagram showing the performance of a damper according to a second embodiment of the invention.

FIG. 3 shows the performance characteristics for a 200 T damper embodiment. This embodiment utilizes the same pressure relief valve as the previous embodiment, comprises however four valve cartridges arranged in two parallel series each having two valves communicating with the cylinder cap volume via a common main bore through the pressure control manifold.

Damper capacity
(gross weight of structure): 200 T
Docking velocity at start
of damper stroke: 0.5 m/s
Cylinder diameter: 400 mm
Stroke length: 500 mm
Max damper force: 2395 kN
Relief valve opening pressure: 165 bar (manually adjustable)

Orifice diameter: 8 mm

Final docking velocity: 0.04 m/s

The similarities in performance for the dampers of Examples I and II demonstrate that the damper is scalable and performs as expected, providing the result and technical effect that is aimed for also at different prerequisites and operating conditions.

The embodiments of Examples I and II are examples picked from a study of dampers ranging from 170-470 mm cylinder inside diameter. The stroke length in the smaller sized dampers was 300 mm, in the larger dampers 500 mm. The pressure relief valves were set to 80-175 bar opening pressure, and the diameter of the orifice ranging from 3-10 mm. The studied dampers were sized for structure net weights of from 32.5 to 200 T. The damper concept is however not limited to the ranges described above but can be scaled also for weights beyond these limits.

All the studied damper sizes performed substantially equally, providing a shock absorbing phase as water is routed through the pressure relief valve until it closes, followed by a soft-landing phase characterized by a substantially constant lowering speed as the water is routed via the orifice. In these embodiments, the end velocity ranged from 0.04 to 0.05 m/s during the terminal length of the stroke. The damper behaviour can however be fine tuned to even lower end velocities if required by changing the size of the orifice.

The detailed specification of embodiments shall not be seen as a statement on the ultimate ranges for similarly performing dampers. On the contrary it can be expected that dampers which are designed outside these ranges, in either end thereof, will provide similar performance if attention is paid to the balance between orifice size, relief valve capacity and opening pressure, for a certain implementation.

Thus, given the structural design and scaling examples disclosed herein, it will be in the hands of a skilled person to design the damper for internal pressures that ensure a substantially constant docking speed at the end of the stroke, yet a pressure which does not exceed the opening pressure of the pressure relief valve.

Modifications of details in the damper as disclosed are possible within the general scope of the invention. For example, in one modified embodiment the openings 9 are closed and blinded, thus eliminating a communication between the cylinder head volume 10 and the ambient environment. Compression of the loaded damper will thus generate negative pressure in the closed cylinder head volume, in result promoting an extension of the piston when the load on the damper is reduced or ceases.

Thus, whether relying upon piston extension based on selfweight and the low friction sealing system S, or relying upon extension based on negative pressure in a sealed cylinder head volume 10, the damper readily and repeatedly resets into an extended, operative state in case of repeated impacts between the docking structures, such as caused from heave of sea e.g.

Another modification foresees a radial mounting of the pressure control manifold 17. More specifically, in alternative to the axial orientation of the through hole 12 in the cap end plate 11, the through hole 12 may have a radial orientation so as to mouth in the periphery of the cap end plate to be mated with a bore through a pressure control manifold that is mounted to the side of the cap end plate 11 or cylinder 1.

Although referred herein mainly as a damper for vertical docking operations subsea it shall finally be noted, that the subject damper is equally effective for horizontal docking operations whether it be on land, at sea surface or subsea. In land-based applications and in operations above sea surface the cylinder cap volume is pre-filled with water or other fluid, but otherwise the damper performs equally above sea level, and with respect to shock absorption independently of its orientation in space, as well as independently of being mounted on the moving structure or on the stationary structure.

The invention claimed is:

1. A damper for absorbing impact shock generated upon docking a moving structure with a stationary structure or foundation, the damper comprising:
    a cylinder (1) connectable to the moving structure, the cylinder arranged with a barrel, a cap end and a head end,
    a piston arrangement (2) movable in the barrel, the piston defining a cylinder cap volume (13) in the cap end of the cylinder which varies with the position of the piston in extension and compression,
    a check valve (14) arranged in the cap end of the cylinder, the check valve in open state permitting flow into the cylinder cap volume (13) as the piston rod is extended out of the cylinder,
    a pressure relief valve (15) in the cap end of the cylinder adjustable to open upon exceeding of a predetermined internal pressure in the cylinder cap volume, in open state permitting restricted flow from the cylinder cap volume,
    an orifice (16; 23) of static size in the cap end of the cylinder, wherein under constant load from the piston during a terminal stroke length of the damper in compression, the orifice provides a restricted flow from the cylinder cap volume generating a constant pressure in the cylinder cap volume below the opening pressure of the pressure relief valve.

2. The damper of claim 1, wherein the flow through the orifice (16; 23) is restricted for generating a constant pressure in the cylinder cap volume (13) from about 5 bar to about 15 bar below the opening pressure of the pressure relief valve (15).

3. The damper of claim 1, wherein the check valve (14) and the pressure relief valve (15) are accommodated in a pressure control manifold (17), as an integer unit connectable to the cylinder (1).

4. The damper of claim 3, wherein pressure control manifolds (17) are arranged connectable in series for multiplication of pressure relief valves (15).

5. The damper of claim 4, wherein the pressure control manifold (17) is arranged with an SAE J518 Code 62 interface for use of high pressure series, standardized 4-bolt flanges in the connection between check valve (14), pressure relief valve (15) and cylinder (1).

6. The damper of claim 1, wherein the piston (6) is journaled in the barrel through a low friction sealing system (S) that promotes extension of the piston through gravity as the damper is lowered.

7. The damper of claim 1, wherein the piston arrangement (2) is a massive component.

8. The damper of claim 1, comprising outlet/inlet openings (9) through the wall of the cylinder in the head end (5) for communication between a cylinder head volume (10) and the surrounding environment.

9. The damper of claim 1, wherein the size of the orifice (16; 23) ranges from 3-10 mm, in dampers ranging from 170-470 mm barrel inside diameter and with stroke lengths of 300-500 mm.

10. The damper of claim 1, wherein the pressure relief valve (15) is manually adjustable for opening pressures ranging from 35 to 420 bar.

\* \* \* \* \*